US012146520B2

(12) United States Patent
Ziltener (10) Patent No.: US 12,146,520 B2
(45) Date of Patent: Nov. 19, 2024

(54) THREADED ROD CONNECTOR WITH MOUTHWARDLY PROJECTING ARMS

(71) Applicant: Hilti Aktiengesellschaft, Schaan (LI)

(72) Inventor: Michael Ziltener, Siebnen (CH)

(73) Assignee: Hilti Aktiengesellschaft, Schaan (LI)

( * ) Notice: Subject to any disclaimer, the term of this patent is extended or adjusted under 35 U.S.C. 154(b) by 433 days.

(21) Appl. No.: 17/628,133

(22) PCT Filed: Aug. 10, 2020

(86) PCT No.: PCT/EP2020/072348
§ 371 (c)(1),
(2) Date: Jan. 18, 2022

(87) PCT Pub. No.: WO2021/032517
PCT Pub. Date: Feb. 25, 2021

(65) Prior Publication Data
US 2022/0260106 A1 Aug. 18, 2022

(30) Foreign Application Priority Data
Aug. 21, 2019 (EP) .................................... 19192851

(51) Int. Cl.
*F16B 37/08* (2006.01)
*E04B 1/41* (2006.01)
(52) U.S. Cl.
CPC ........ *F16B 37/0864* (2013.01); *E04B 1/4121* (2013.01)
(58) Field of Classification Search
CPC .... F16B 37/08; F16B 37/0864; F16B 37/045; F16B 37/0857; F16B 37/043;
(Continued)

(56) References Cited
U.S. PATENT DOCUMENTS
4,618,300 A 10/1986 Goebel
4,890,966 A 1/1990 Umezawa
(Continued)

FOREIGN PATENT DOCUMENTS
CA 3001418 A1 10/2018
EP 2017485 A2 1/2009
(Continued)

OTHER PUBLICATIONS
International Search Report of PCT/EP2020/072348, dated Oct. 27, 2020.
U.S. Appl. No. 17/628,649, filed Jan. 20, 2022 which is national phase of PCT/EP2020/072495, filed on Aug. 11, 2020, and published as WO 2021/032536 A1.
(Continued)

*Primary Examiner* — Daniel J Wiley
(74) *Attorney, Agent, or Firm* — Davidson Kappel LLC (57) ABSTRACT

Threaded rod connector including a housing having a cavity for receiving a threaded rod therein, wherein the cavity has a mouth, and an insert including a plurality of rod engagement segments, which are arranged within the cavity, wherein the cavity has a tapered zone tapering towards the mouth for wedging the rod engagement segments against the threaded rod, wherein the insert further includes a plurality of segment carrying arms, each having a segment connection end and an interconnection end, which is located opposite the segment connection end on the respective segment carrying arm, wherein each of the rod engagement segments is connected to at least one of the segment carrying arms at the segment connection end thereof, and wherein the segment carrying arms are interconnected at their interconnection ends. Each of the segment carrying arms extends, originating from its segment connection end, towards the mouth of the cavity.

19 Claims, 5 Drawing Sheets

(58) Field of Classification Search
CPC ........ F16B 37/0842; F16B 35/06; E04B 1/41; E04B 1/4121; E04B 1/4135
See application file for complete search history.

(56) References Cited

U.S. PATENT DOCUMENTS

| | | | |
|---|---|---|---|
| 5,468,105 | A | 11/1995 | Iwamoto |
| 6,007,284 | A | 12/1999 | Taneichi et al. |
| 8,051,615 | B2 * | 11/2011 | Mathews ............... F16G 11/106 52/223.13 |
| 8,434,725 | B2 | 5/2013 | Oh et al. |
| 9,091,064 | B1 * | 7/2015 | Dahl ....................... E04C 5/122 |
| 2002/0001504 | A1 | 1/2002 | McCallion |
| 2015/0275505 | A1 | 10/2015 | Thompson et al. |
| 2018/0187705 | A1 | 7/2018 | Oh et al. |

FOREIGN PATENT DOCUMENTS

| | | |
|---|---|---|
| GB | 624714 A | 6/1949 |
| GB | 628316 A | 8/1949 |
| WO | WO 2021/032517 A1 | 2/2021 |
| WO | WO 2021/032527 A1 | 2/2021 |
| WO | WO 2021/032536 A1 | 2/2021 |

OTHER PUBLICATIONS

U.S. Appl. No. 17/628,133, filed Jan. 18, 2022 which is a national phase of PCT/EP2020/072348, filed on Aug. 10, 2020 and published as WO 2021/032517 A1.

U.S. Appl. No. 17/628,708, filed Jan. 20, 2022 which is a national phase of PCT/EP2020/072443 filed on Aug. 11, 2020 and published as WO 2021/032527 A1.

* cited by examiner

THREADED ROD CONNECTOR WITH MOUTHWARDLY PROJECTING ARMS

BACKGROUND

U.S. Pat. Nos. 8,434,725 A, 5,468,105 A and US2018/0187705 A1 disclose quick acting threaded rod connectors having threaded rod engagement segments arranged in a tapered cavity, wherein the taper of the cavity wedges the threaded rod engagement segments against the threaded rod. In each case, the threaded rod engagement segments are axially biased, by an axial compression spring, against the taper of the cavity, to ensure initial engagement of the threaded rod.

EP2017485 A2 describes a channel nut having threaded shells through which a threaded rod can be pushed. The channel nut has an operating cylinder, which is rotationally connected to the threaded shells to manually rotate the shells in order to adjust the height of the threaded rod held within the channel nut. After height adjustment, the operating cylinder can be manually pushed into the channel nut, which locks the shells against the threaded rod.

GB624714 A describes a quick connector for threaded rods, which comprises a plurality of rod engagement segments arranged within a cavity in a housing. The rod engagement segments are intended to be wedged against the threaded rod for locking the threaded rod. For initial engagement, the rod engagement segments are radially biased against the threaded rod by elastic arms, which extend from the rod engagement segments towards the bottom of the cavity, and which are interconnected with each other near the bottom of the cavity.

SUMMARY OF THE INVENTION

It is an object of the invention to provide a threaded rod connector which provides particularly good functionality and versatility, whilst being particularly reliable and easy to manufacture.

The present invention provides a threaded rod connector comprising a housing (1) having a cavity (10) for receiving a threaded rod therein, wherein the cavity (10) has a mouth (11) for inserting the threaded rod into the cavity (10), and an insert (3) comprising a plurality of rod engagement segments (50), which are arranged within the cavity (10), wherein each of the rod engagement segments (50) has a mating thread structure (51) for engaging the thread of the threaded rod, wherein the cavity (10) has a tapered zone (14) tapering towards the mouth (11) of the cavity (10) for wedging the rod engagement segments (50) against the threaded rod, wherein the insert (3) further comprises a plurality of segment carrying arms (40), each having a segment connection end (45) and an interconnection end (43), which is located opposite the segment connection end (45) on the respective segment carrying arm (40), wherein each of the rod engagement segments (50) is connected to at least one of the segment carrying arms (40) at the segment connection end (45) thereof, and wherein the segment carrying arms (40) are interconnected at their interconnection ends (43).

According to the invention, each of the segment carrying arms extends, originating from its segment connection end, towards the mouth of the cavity.

Thus, the segment carrying arms project from the rod engagement segments rearwardly, towards the mouth of the cavity. In other words, the segment carrying arms extend between the rod engagement segments and the mouth of the cavity. As a consequence, the insert is particularly well-accessible from outside of the cavity. This, in turn, can allow to grasp the insert from outside of the cavity, which can open the possibility to manipulate the rod engagement segments. It has been found that this can provide particularly good functionality: For example, the insert including the rod engagement segments can be rotated for changing the axial position of a threaded rod engaged by the rod engagement segments (for example for tensioning the threaded rod, detaching the threaded rod or adjusting the height of the threaded rod). Moreover, unwanted spinning of the rod engagement segments can be counteracted in a particularly easy manner by grasping the insert. In addition, the rod engagement segments can be manually wedged and released by grasping the insert. All of this can provide particularly good functionality and versatility, at low manufacturing effort.

The interconnection ends of the segment carrying arms can be located outside of the cavity. In this case, each of the segment carrying arms extends, originating from its segment connection end, towards the mouth of the cavity and beyond.

The housing could for example be a threaded socket, a screw head or a cast-in anchor intended to be cast into concrete.

The cavity can be a blind hole, wherein the bottom of the hole could be formed by an element integral with the rest of the housing or by a separate plug. Alternatively, it can be a through hole. In this case, a ring-shaped bottom could be provided. The threaded rod can be inserted into the cavity via the mouth of the cavity. In particular, the mouth can be open, or it can be covered by structures that can easily be penetrated by the threaded rod.

The rod engagement segments are arranged within the cavity so as to surround the threaded rod inserted into the cavity. The mating thread structure for engaging the thread of the threaded rod is an internal thread structure, whereas the thread of the threaded rod is an external thread. The mating thread structure can be a thread segment or a more rudimentary structure, consisting only of fractions of a thread. The mating thread structure corresponds to the thread of the threaded rod and/or is able to mesh with and engage into the thread of the threaded rod.

The tapered zone tapers towards the mouth, i.e. it becomes narrower as it approaches the mouth. In particular the tapered zone of the cavity has a wide end and a narrow end, which is closer to the mouth of the cavity than the wide end. The tapered zone is able to radially wedge the rod engagement segments against the threaded rod when the threaded rod is pulled axially through the mouth out of the cavity.

In particular, the insert has elasticity to allow the threaded rod to ratchet into the mating thread structures of the rod engagement segments. Accordingly, the insert is sufficiently elastic to allow, without breaking, the rod engagement segments to displace radially outwardly when the mating thread structures of the rod engagement segments temporarily become misaligned with the corresponding thread of the threaded rod as the threaded rod is displaced axially with respect to the rod engagement segments. In particular, the elasticity of the insert can radially bias the mating thread structures against the thread of the threaded rod for provisional engagement.

Each of the rod engagement segments is connected to at least one of the segment carrying arms at the segment connection end of the respective arm. More preferably, each of the rod engagement segments is connected to precisely one of the segment carrying arms at the segment connection end thereof, i.e. the number of rod engagement segments equals the number of segment carrying arms. The threaded rod connector comprises at least two rod engagement segments and at least two segment carrying arms. Preferably, the threaded rod connector comprises four rod engagement segments and four segment carrying arms. The rod engagement segments are, in particular, arranged in an annular relationship, preferably with equidistant spacing. The threaded rod connector could also comprise auxiliary rod engagement segments, which are not connected to a segment carrying arm, and/or the insert could also comprise auxiliary arms, which are not directly connected to a rod engagement segment.

Connection between the respective rod engagement segment and the respective segment carrying arm at the segment connection end thereof is preferably direct. However, there could also be a bridge between the respective rod engagement segment and the segment connection end of the respective segment carrying arm. Preferably, the connection between the respective rod engagement segment and the respective segment carrying arm is at a rearward end, i.e. at an end facing the mouth, of the respective rod engagement segment. However, in particular if a bridge is provided, connection could also be elsewhere on the respective rod engagement segment.

The interconnection end of each of the segment carrying arms is located opposite to the segment connection end on the respective segment carrying arm, and/or the longitudinal direction of the respective segment carrying arm extends between its segment connection end and its interconnection end. Connection between the rod engagement segments and the respective adjacent segment carrying arm is located at the segment connection end of the adjacent segment carrying arm.

The segment carrying arms are interconnected at their interconnection ends. Accordingly, the segment carrying arms are either directly connected to each other at their interconnection ends, or, preferably, there is an additional structure, such as a collar, which is connected to the segment carrying arms at their respective interconnection ends, and which interconnects the segment carrying arms.

At least some of the rod engagement segments, preferably all of them, can have, in a rearward zone facing the segment carrying arms, an outside chamfer intended for contacting the housing in the tapered zone of the cavity. Providing the rod engagement segments with an outside chamfer that corresponds at least approximately to the taper of the tapered zone of the cavity can increase the contact surface between the rod engagement segments and the housing, thereby efficiently counteracting jamming.

It is especially preferred that the insert, in particular at least the collar thereof, sticks out of the cavity. This provides particularly good access to the insert, thereby further improving functionality, and a compact yet robust design. It is possible that all of the collar sticks out of the cavity. Or the collar can have several distinct sections, wherein only some of them stick out of the cavity.

It is advantageous that the insert is free to rotate in the cavity. This provides particularly good functionally and versatility. For example, tensioning, detachment and/or height adjusting functionality can be provided. Preferably, the cavity has circular symmetry, i.e. it can be rotated by any arbitrary angle and map onto itself. This gives a smooth cavity, efficiently counteracting jamming of the insert during rotation.

As already hinted at above, the insert can, advantageously, further comprise a collar which interconnects the segment carrying arms at their interconnection ends, wherein the collar has a rod accommodation hole for accommodating, in particular for passing through, the threaded rod. This can give a device which is particularly easy to manufacture, particularly easy to handle and particularly functional and versatile. The collar could be C-shaped, but preferably, it is a closed ring, which can provide particularly good robustness whilst being easy to manufacture. The rod accommodation hole allows to pass the threaded rod through the collar, past the segment carrying arms, into the mating thread structures of the rod engagement segments. In particular, the collar can be located at a rear end of the insert that is remote from the rod engagement segments, leading to a particularly compact design, further facilitating manufacture. In particular, the rod accommodation hole is a through hole.

The insert preferably further comprises an engagement surface for wrench tool engagement for rotating the insert within the cavity. Accordingly, the insert can be engaged at its engagement surface in order to rotate the insert within the cavity, in particular for threaded displacement. This can further improve functionality. The engagement surface can for example comprise polygonal surfaces, splines or channels, into which a corresponding wrench tool can engage. Preferably, the engagement surface can stick out of the cavity.

It is particularly preferred that the engagement surface is provided on the collar, which can lead to a particularly compact and robust design.

Advantageously, the insert has spring-tensionless axial play within the cavity. Accordingly, the insert can axially travel a certain distance within the cavity without changing tension of a spring. Initial engagement of the threaded rod can be effected by elasticity of the insert, and therefore, a compression spring axially biasing the rod engagement segments against the tapered zone is regularly not required, thereby further facilitating manufacture.

According to another preferred embodiment of the invention, the insert further comprises at least one stop surface for abutting against the housing to limit insertion depth of the insert into the cavity, more preferably such that the free ends of the rod engagement segments cannot touch the housing. Accordingly, the insert abuts against the housing, in particular at a bearing surface remote from the bottom of the cavity, when the insert reaches a certain insertion depth in the cavity. Preventing the rod engagement segments from touching the bottom of the cavity can counteract unwanted friction, thereby further improving engagement reliability. In particular, the stop surface projects radially on the insert. The stop surface preferably has annular form, continuously annular or broken annular.

The at least one stop surface is preferably located on the collar. In particular, it can be located at an underhead surface of the collar. This can lead to a particularly compact robust and design, further facilitating manufacture.

It is particularly preferred that the at least one stop surface is configured for abutting against the housing at a location outside of the cavity to limit insertion depth of the insert into the cavity, in particular such that the free ends of the rod engagement segments cannot touch the housing. This can lead to a particular simple design, thereby further facilitating manufacture. In particular, no complex modification of the cavity might be required.

The housing preferably has a bearing surface which annularly surrounds the mouth of the cavity, for stop surface abutment. This can further improve operation. More preferably, the bearing surface is flat. This allows to rotate the insert whilst the stop surface abuts against the bearing surface without causing translation of the insert, thereby further improving functionality and reliability. In particular, this can further facilitate threaded rod displacement by insert rotation.

The insert is preferably monolithic, further improving robustness and facilitating manufacture.

Preferentially, at least some of the rod engagement segments, more preferably all of them, have a chamfered tip for facilitating insertion of the insert into the cavity. This can further facilitate assembly of the connector. The chamfered tip faces the bottom of the cavity.

According to another preferred embodiment of the invention, the insert has a ring shoulder for laterally supporting the insert in the cavity, wherein the ring shoulder is located on the interconnection ends of the segment carrying arms or on the collar. Accordingly, the insert has a structure that can radially abut against the wall of the cavity when the insert is laterally loaded, in particular by the threaded rod located therein. This can yield particularly good performance, in particular in lateral load situations. The ring shoulder can be located at the interconnection ends of the segment carrying arms or on the collar, i.e. in a region of the insert that is located close to the mouth of the cavity, which can further improve load transfer. The ring shoulder can form a continuous ring or a broken ring, the latter in particular when the ring shoulder is located on the segment carrying arms.

The invention also relates to a method of using the connector, in which the insert is rotated within the housing relative to a threaded rod engaged by the rod engagement segments, thereby translating the threaded rod relative to the insert. The threaded rod is thus axially displaced with respect to the insert by rotating the insert with respect to the threaded rod. Accordingly, the height of the threaded rod in the connector can be adjusted, the threaded rod can be detached, and/or the threaded rod can be tensioned without the need to rotate the threaded rod.

Features that are described here in connection with the connector can also be used in connection with the method and features that are described here in connection with the method can also be used in connection with the connector.

BRIEF DESCRIPTION OF THE DRAWINGS

The following description explains the invention using illustrative embodiments and drawings.

DETAILED DESCRIPTION

Figure 1:
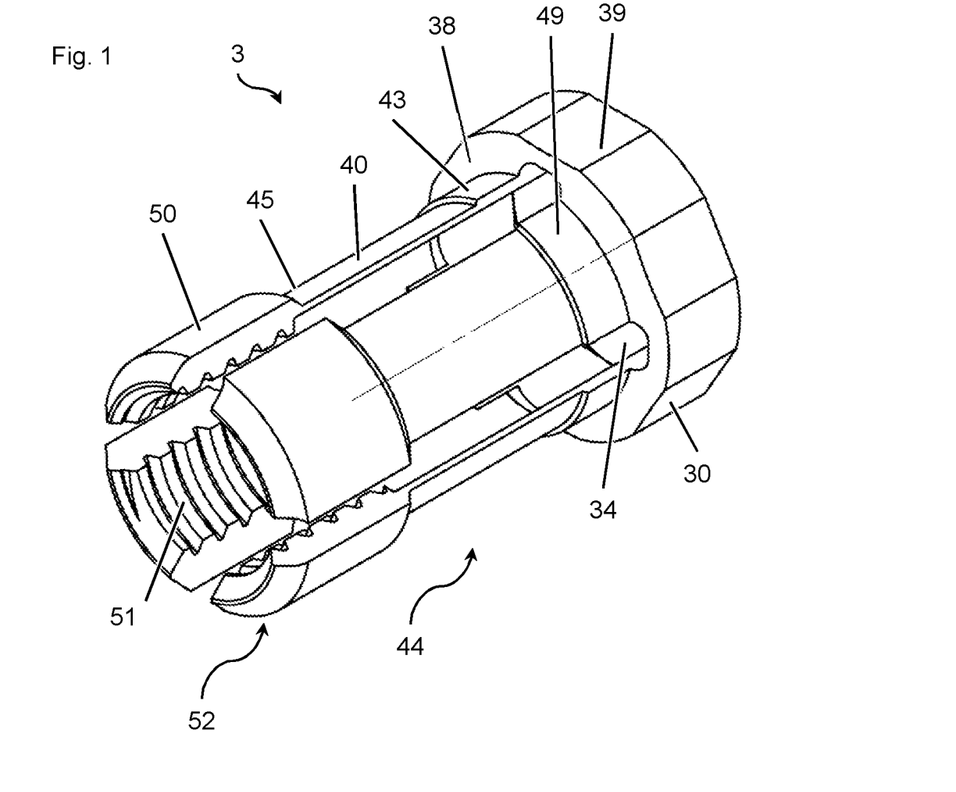
FIG. 1 is an isometric view of an insert intended to be used in a threaded rod connector.
Figure 2:
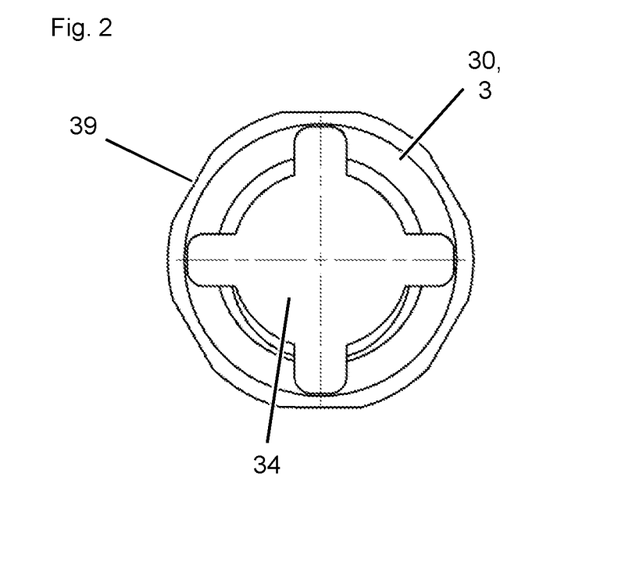
FIG. 2 is a top view of the insert of FIG. 1.

FIGS. 1 and 2 illustrate an insert 3 intended to be used as a part of a threaded rod connector. The insert 3 comprises a plurality, four in the present case, of rod engagement segments 50. The rod engagement segments 50 have a shell-like shape each and surround a receiving space for a threaded rod (shown schematically as 100 with a thread 101 in FIG. 4). Each of the rod engagement segments 50 has, on its inside facing the receiving space, a mating thread structure 51 mating with the external thread of the threaded rod. The rod engagement segments 50 are arranged axially abreast. The mating thread structures 51 are of the inner thread type. In the shown embodiment, each of the mating thread structures 51 is a continuous cut-out of an internal thread, but the mating thread structures 51 could also be differently shaped. In particular, they could be more rudimentary and could for example include discontinuous thread structures.

The insert 3 further comprises a plurality of, four in the present case, segment carrying arms 40. In particular, the number of segment carrying arms 40 equals the number of rod engagement segments 50. Each of the segment carrying arms 40 has a segment connection end 45 and an interconnection end 43, wherein the segment connection end 45 and the interconnection end 43 are opposite ends of the respective segment carrying arm 40. Each of the segment carrying arms 40 has one of the rod engagement segments 50 connected thereto, namely at the segment connection end 45 of the respective segment carrying arm 40. In the present embodiment, connection between the segment carrying arms 40 and the associated rod engagement segments 50 is direct in each case. The segment carrying arms 40 form a cage 44, which can accommodate the threaded rod. In the present embodiment, the segment carrying arms 40 are parallel to each other and parallel to the axial direction, i.e. parallel to the longitudinal axis of the insert 3.

The insert 3 further comprises a collar 30, which is directly connected to the segment carrying arms 40 at their respective interconnection ends 43. The collar 30 thus directly interconnects the segment carrying arms 40, and it also interconnects the rod engagement segments 50, namely indirectly, via the segment carrying arms 40. The collar 30 could e.g. be C-shaped, or it can, as shown here, be a closed annulus. The collar 30 surrounds a rod accommodation hole 34 for accommodating the threaded rod. The rod accommodation hole 34 is, by way of example, a through hole. The rod accommodation hole 34 is axially aligned with the cage 44 of segment carrying arms 40 and with the receiving space that is located between the rod engagement segments 50. Consequently, the straight threaded rod can be located, simultaneously, within the receiving space of the rod engagement segments 50, within the cage 44 and within the rod accommodation hole 34.

The insert 3 is elastic so that a threaded rod with an external thread mating with the mating thread structure 51 can be ratcheted into the rod engagement segments 50. In this ratcheting process, the rod engagement segments 50 are displaced radially outwardly when the mating thread structures 51 and the external thread of the threaded rod are temporarily out of axial alignment, and the elasticity of the insert 3, in particular of the segment carrying arms 40, can radially return the rod engagement segments 50 into engagement with the external thread of the threaded rod when axial alignment between the mating thread structures 51 and the external thread of the threaded rod is restored. In particular, the elasticity of the insert 3 can radially bias the rod engagement segments 50 at their mating thread structures 51 against the threaded rod. Elasticity can be primarily caused by the segment carrying arms 40, whereas the collar 30 can be relatively rigid.

The collar 30 radially projects over the cage 44 of segment carrying arms 40. It has a planar, annular stop surface 38 which projects radially on the insert 3. The stop surface 38 faces the segment carrying arms 40. In the shown embodiment, the stop surface 38 defines a forward boundary of the collar 30. However, this is an example only, and the collar 30 could e.g. also have a forward zone located between the segment carrying arms 40 and the stop surface 38.

The collar 30 of the insert 3 furthermore comprises an engagement surface 39, which is provided for positive mechanical engagement of the collar 30 for rotationally coupling the insert 3 to another element, in particular for rotationally locking the insert 3 in a housing 1 or for grasping the insert 3 with a wrench tool for rotating the insert 3. In the shown embodiment, the engagement surface 39 is a polygonal surface comprising a plurality of flats arranged to give a polygonal outline. However, other embodiments of engagement surfaces are also possible, for example comprising keys, keyseats, splines, channels or protrusions.

At their free ends, which are located remote from the segment carrying arms 40 and facing away from the collar 30, the rod engagement segments 50 have a chamfered tip 52, which can facilitate insertion into a cavity 10 during assembly of a threaded rod connector, or which can increase contact surface with a tapered zone 14 of a cavity 10. The rearward ends of the rod engagement segments 50, i.e. the ends facing the collar 30 and the segment carrying arms 40, also have an outside chamfer, e.g. in order to increase contact surface with a tapered zone 14 of a cavity 10.

The insert 3 further comprises a ring shoulder 49, which is a broken-type ring shoulder 49 located on the interconnection ends 43 of the segment carrying arms 40 in the shown embodiment, but which could also be located on the above-mentioned forward zone of the collar 30. This ring shoulder 49 is for laterally supporting the insert 3 within a cavity 10.

The insert 3 is monolithic and preferably consists of metal, more preferably steel. The insert 3 has rotational symmetry, four-fold rotational symmetry in the present case, i.e. rotation by 90° maps the insert 3 onto itself.

FIGS. 3 to 6 show a first embodiment of a threaded rod connector that comprises the insert 3 of FIGS. 1 and 2.

In addition to the insert 3 of FIGS. 1 and 2, the threaded rod connector comprises a housing 1, which has an elongate cavity 10 provided therein. The cavity 10 extends parallel to the longitudinal axis of the connector. At its first end, the cavity 10 has a mouth 11, which allows to insert a threaded rod into the cavity 10. At its opposite second end, the cavity has a closed bottom 18. The cavity 10 is thus a blind hole. Closure of the cavity 10 at its bottom 18 is effected by a plug 85 that is plugged into the housing 1.

The insert 3 is arranged within the cavity 10, in the present embodiment in its entirety. The insert 3 and the cavity 10 are arranged coaxially. In the present embodiment, the insert is located collar-first in the cavity 10, i.e. the collar 30 is located closer to the bottom 18 of the cavity 10 than the rod engagement segments 50, and the segment carrying arms 40 project from rod engagement segments 50 in a direction away from the mouth 11, towards the bottom 18. In other words, the segment carrying arms 40 project from the collar 30 towards the mouth 11, away from the bottom 18.

The cavity 10 comprises a collar locking zone 16, which is located close to the bottom 18 of the cavity 10, in particular adjacent to the bottom 18. The collar 30 and in particular its engagement surface 39 are located within the collar locking zone 16. In the collar locking zone 16, the cavity 10 has a cross-section that mates with the engagement surface 39 of the collar 30. As a consequence, the housing 1 engages and rotationally locks the collar 30 and thus the insert 3 by means of positive mechanical engagement. Rotational lock can be with some angular play, or, as in case of the present embodiment, angularly tight.

Outside of the collar locking zone 16, the cavity 10 generally has circular symmetry. Thus, the segment carrying arms 40 and the rod engagement segments 50 would be free to rotate in the cavity 10 if they were not connected to the collar 30. In other words, the insert 3 is rotationally locked to the housing 1 at the collar 30 only, namely at its engagement surface 39.

The cavity 10 moreover comprises a tapered zone 14, in which the cavity 10 narrows as it approaches the mouth 11. This tapered zone 14 is located in the cavity 10 axially between the collar locking zone 16 and the mouth 11. In the tapered zone 14, the wall of the cavity 10 provided by the housing 1 forms a wedge surface, which wedge surface radially displaces rod engagement segments 50 sliding thereon radially inwardly when the rod engagement segments 50 are moved axially towards the mouth 11. The tapered zone 14 faces the rod engagement segments 50 and the bottom 18 of the cavity 10.

The insert 3 has some axial play within the cavity 10. As a consequence, the insert 3 can be moved between the position shown in FIG. 3, in which the wall of the cavity 10 does not radially act on the rod engagement segments 50, and in which the insert 3 abuts on the bottom 18 of the cavity 10, and the position shown in FIG. 4, in which the insert 3 is located axially closer to the mouth 11 of the cavity. In the position shown in FIG. 4, the wall of the cavity 10 in the tapered zone 14 radially acts against the rod engagement segments 50, in particular to lock the rod engagement segments 50 to a threaded rod. The engagement surface 39 has sufficient axial length so that the positive mechanical engagement and thus the rotational lock between the housing 1 and the insert 3 is maintained both in the positions shown in FIG. 3 and in FIG. 4.

Figure 3:
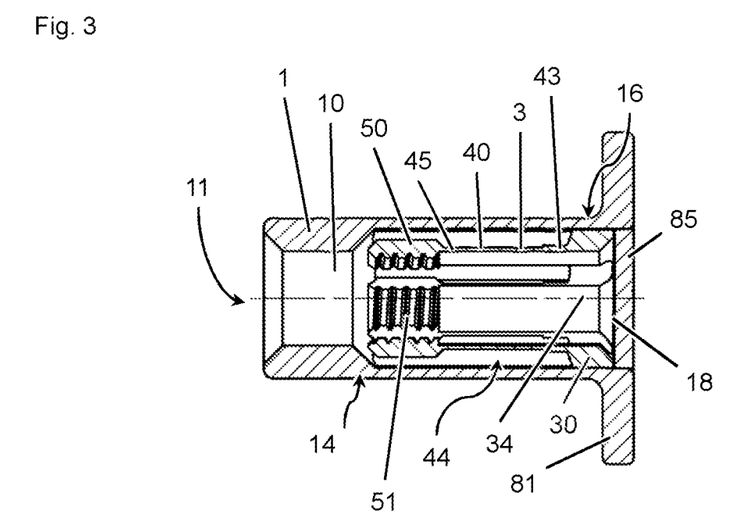
FIG. 3 is a sectional side view of a first threaded rod connector including the insert of FIGS. 1 and 2, in a first configuration.

When a threaded rod is installed within the threaded rod connector, the threaded rod is inserted via the mouth 11 into the cavity 10, where it first abuts against the rod engagement segments 50. If not already in the maximum insertion depth position shown in FIG. 3, this abutment will push the insert 3 deeper into the cavity 10, until the insert 3 abuts on the bottom 18, as shown in FIG. 3. When the threaded rod is then pushed even deeper into the cavity 10, it ratchets into the rod engagement segments 50, where it is provisionally engaged by the mating thread structures 51 by means of the elasticity of the insert 3. If the threaded rod is subsequently loaded in a direction pointing out of the mouth 11, the threaded rod will drag along the rod engagement segments 50, until they are wedged against the threaded rod by the tapered zone 14 of the cavity 10, resulting in tight engagement of the threaded rod, for example in a configuration shown in FIG. 4.

Figure 4:
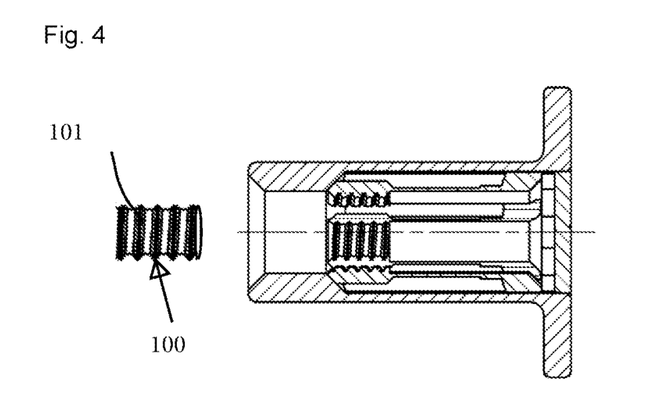
FIG. 4 is a sectional side view of the threaded rod connector of FIG. 3, in a second configuration.
Figure 5:
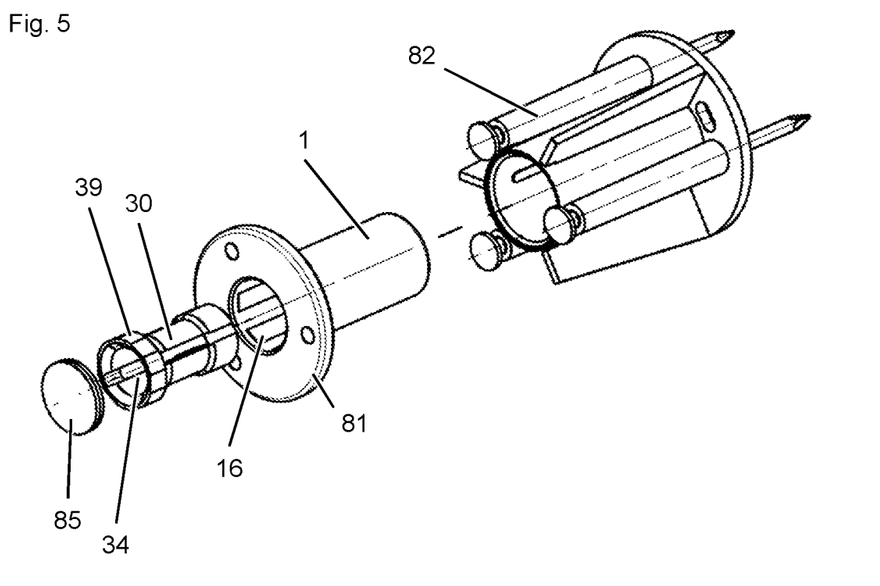
FIG. 5 is an exploded view of the threaded rod connector of FIG. 3.
Figure 6:
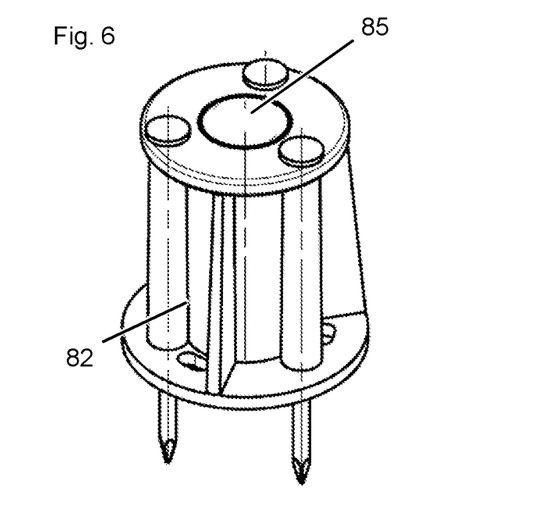
FIG. 6 is an isometric view of the threaded rod connector of FIG. 3.

Due to the elasticity of the insert 3, the threaded rod connector can engage the threaded rod without the need to axially bias the rod engagement segments 50 against the tapered zone 14. Thus, the insert 3 can have spring-tensionless play within the cavity 10.

Since the insert 3 is rotationally locked within the housing 1 via the collar locking zone 16, it is possible to unscrew the threaded rod from the insert 3 without the insert 3 spinning within the housing 1.

The housing 1 can form the stem of a cast-in anchor that is intended to be cast into concrete. Such a cast-in anchor can comprise an anchor flange 81, attached to the housing 1 at its end remote from the mouth 11, for anchoring the cast-in anchor within the concrete. Preferably, a base holder 82 (FIG. 6) might be provided for mounting the cast-in anchor to a shuttering before casting the concrete, wherein the shuttering might be a wood form, a pan deck or a metal deck.

Figure 7:
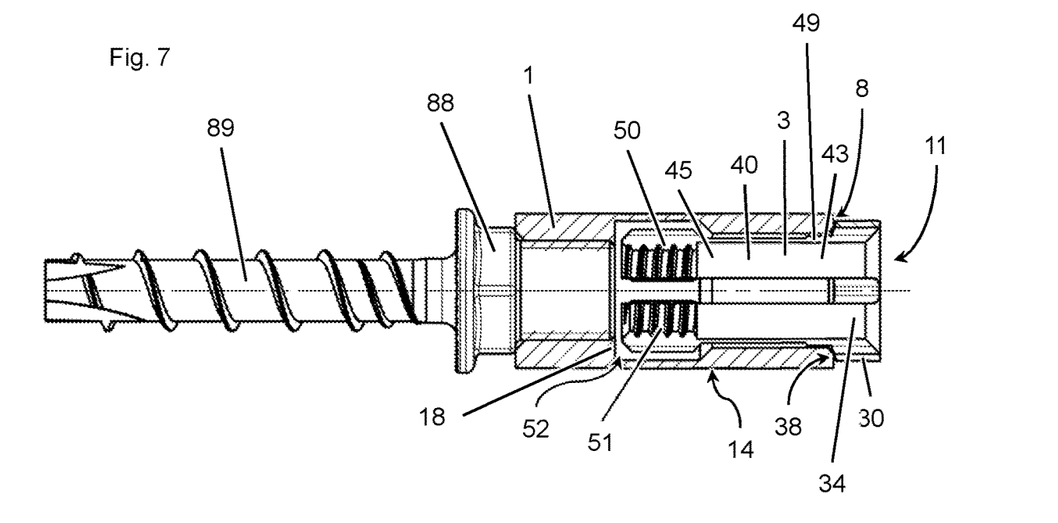
FIG. 7 is a sectional side view of a second threaded rod connector including the insert of FIGS. 1 and 2, in a first configuration.
Figure 8:
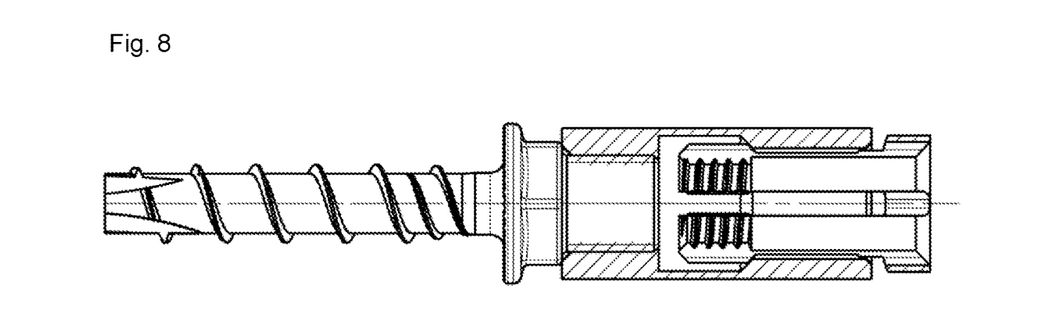
FIG. 8 is a sectional side view of the threaded rod connector of FIG. 7, in a second configuration.
Figure 9:
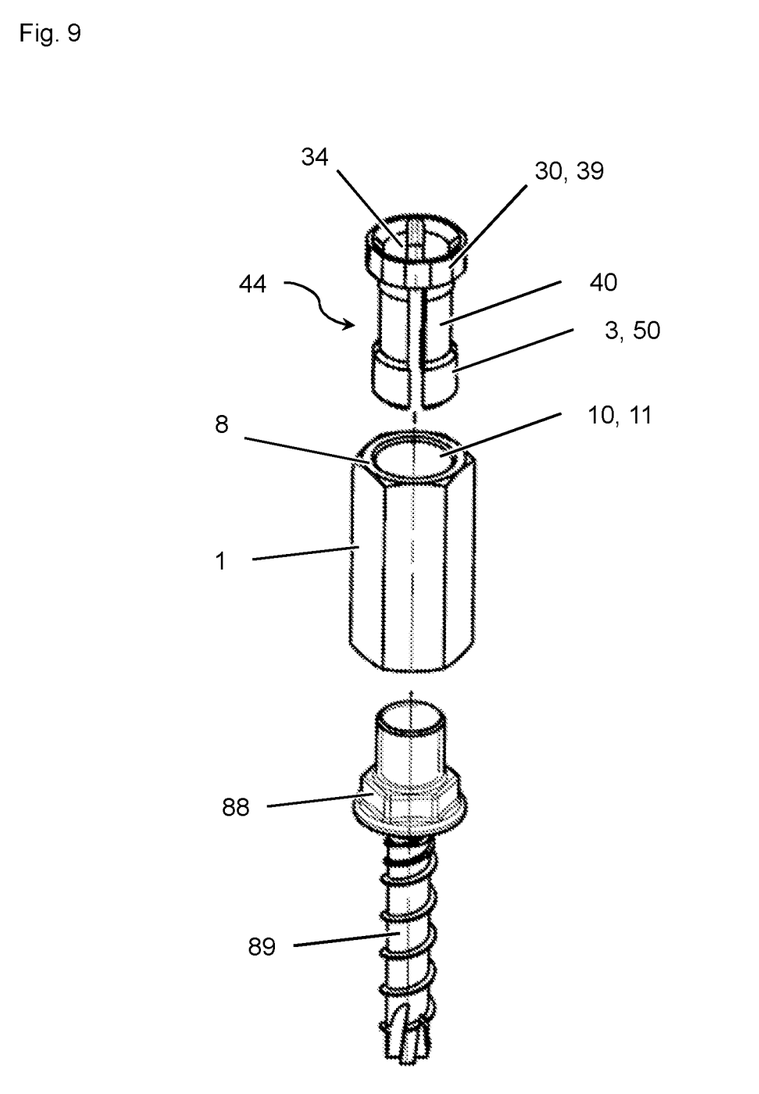
FIG. 9 is an exploded view of the threaded rod connector of FIG. 7.

FIGS. 7 to 9 show a second embodiment of a threaded rod connector that comprises the insert 3 of FIGS. 1 and 2.

In addition to the insert 3 of FIGS. 1 and 2, the threaded rod connector again comprises a housing 1 which has an elongate cavity 10 provided therein. The cavity 10 extends parallel to the longitudinal axis of the connector. At its first end, the cavity 10 has a mouth 11, which allows to insert a threaded rod into the cavity 10. At its opposite second end, the cavity has an incomplete, ring-shaped bottom 18. The cavity 10 is thus a stepped hole.

The insert 3 is arranged within the cavity 10, but only partly in the present embodiment, i.e. a part of the insert 3, in particular its collar 30, sticks out of the cavity 10. The insert 3 and the cavity 10 are arranged coaxially. In the present embodiment, the insert is located with the rod engagement segments 50 first in the cavity 10, i.e. the rod engagement segments 50 are located closer to the bottom 18 of the cavity 10 than the collar 30, and the segment carrying arms 40 project from rod engagement segments 50 rearwards, in a direction towards the mouth 11, away from the bottom 18. In particular, each of the segment carrying arms 40 extends, originating from its segment connection end 45, towards the mouth 11 of the cavity 10. In other words, the segment carrying arms 40 project from the collar 30 towards the bottom 18.

The cavity 10 once again comprises a tapered zone 14, in which the cavity 10 narrows as it approaches the mouth 11. In the tapered zone 14, the wall of the cavity 10 provided by the housing 1 forms a wedge surface, which wedge surface radially displaces rod engagement segments 50 sliding thereon radially inwardly when the rod engagement segments 50 are moved axially towards the mouth 11. The tapered zone 14 faces the rod engagement segments 50 and the bottom 18 of the cavity 10.

The insert 3 has some axial play within the cavity 10. Consequently, the insert 3 can be moved between the maximum insertion depth position shown in FIG. 7, in which the collar 30 abuts on the housing 1, to the position shown in FIG. 8, in which the insert 3 is located further out of the cavity 10. In the position of FIG. 7, the wall of the cavity 10 does not radially act on the rod engagement segments 50, whereas in the position of FIG. 8, the wall of the cavity 10 in the tapered zone 14 radially acts against the rod engagement segments 50, in particular to lock the rod engagement segments 50 to a threaded rod.

The housing 1 has a flat, annular bearing surface 8 surrounding the cavity 10. The stop surface 38 of the collar 30 faces this bearing surface 8 and abuts against the bearing surface 8 when the maximum insertion depth position of FIG. 7 is reached, thus preventing the collar 30, in particular its engagement surface 39, from being drawn completely into the cavity 10. Abutment of the stop surface 38 against the bearing surface 8 also prevents the rod engagement segments 50 from abutting against the bottom 18 of the cavity 10, thus ensuring free movement of the rod engagement segments 50 when the threaded rod is ratcheted in.

The insert 3 is free to rotate in the cavity 10. In particular, the cavity 10 has generally circular symmetry. Since the bearing surface 8 is flat, the insert 3 can rotated without axial displacement even when the stop surface 38 abuts against the bearing surface 8.

When a threaded rod is installed within the threaded rod connector, the threaded rod is inserted via the mouth 11 into the cavity, where it abuts against the rod engagement segments 50 from inside the cage 44 of segment carrying arms 40. If not already in the maximum insertion depth position of FIG. 7, this abutment will first push the insert 3 deeper into the cavity 10, until the maximum insertion depth position of FIG. 7, where the insert 3 abuts on its stop surface 38 against the bearing surface 8, is reached. When the threaded rod is then pushed even deeper into the cavity 10, it ratchets into the rod engagement segments 50, where it is provisionally engaged by the mating thread structures 51 by means of the elasticity of the insert 3. If the threaded rod is subsequently loaded in a direction pointing out of the mouth 11, the threaded rod will drag along the rod engagement segments 50, until they are wedged against the threaded rod by the tapered zone 14 of the cavity 10, resulting in tight engagement of the threaded rod, for example in a configuration shown in FIG. 8.

Due to the elasticity of the insert 3, the threaded rod connector can engage the threaded rod without the need to axially bias the rod engagement segments 50 against the tapered zone 14. Thus, the insert 3 can have spring-tensionless play within the cavity 10.

Since the insert 3 is free to rotate within the housing 1, the threaded rod engaged by the rod engagement segments 50 can be axially displaced (for example for tensioning the threaded rod, detaching the threaded rod or adjusting the height of the threaded rod) without the need to rotate the threaded rod itself. Rotation of the insert 3 can for example be effected by manually grasping the collar 30, or by engaging the engagement surface 39 by a mating wrench tool.

The ring shoulder 49 of the insert 3, which is located adjacent to the stop surface 38, can laterally abut against the wall of the cavity 10 when the insert 3 is laterally loaded, which can improve shear characteristics of the threaded rod connector.

The housing 1 can be attached to the head 88 of a screw anchor 89, in particular with the cavity 10 orientated coaxially with the screw anchor 89. For example, the housing 1 can be screwingly connected to the head 88, as shown here. Alternatively, the housing 1 and the head 88 could also be monolithic.

What is claimed is:

1. A threaded rod connector comprising:
    a housing having a cavity for receiving a threaded rod therein, the cavity having a mouth for inserting the threaded rod into the cavity, and
    an insert including a plurality of rod engagement segments arranged within the cavity, each of the rod engagement segments having a mating thread structure for engaging a thread of the threaded rod,
    the cavity having a tapered zone tapering towards the mouth of the cavity for wedging the rod engagement segments against the threaded rod,
    the insert further including a plurality of segment carrying arms, each having a segment connection end and an interconnection end located opposite the segment connection end on a respective segment carrying arm,
    each of the rod engagement segments being connected to at least one of the segment carrying arms at the segment connection end thereof, and the segment carrying arms being interconnected at the interconnection ends, each of the segment carrying arms extends, originating from the segment connection end, towards the mouth of the cavity.

2. The connector as recited in claim 1 wherein the insert sticks out of the cavity.

3. The connector as recited in claim 1 wherein the insert is free to rotate in the cavity.

4. The connector as recited in claim 1 wherein the insert further includes a collar interconnecting the segment carrying arms at the interconnection ends, the collar having a rod accommodation hole for accommodating the threaded rod.

5. The connector as recited in claim 4 wherein the insert further includes an engagement surface for wrench tool engagement for rotating the insert within the cavity, the engagement surface being provided on the collar.

6. The connector as recited in claim 1 wherein the insert has spring-tensionless axial play within the cavity.

7. The connector as recited in claim 1 wherein the insert further includes at least one stop surface for abutting against the housing to limit insertion depth of the insert into the cavity.

8. The connector as recited in claim 7 wherein the at least one stop surface is located on the collar.

9. The connector as recited in claim 7 wherein the at least one stop surface is configured for abutting against the housing at a location outside of the cavity to limit insertion depth of the insert into the cavity.

10. The connector as recited in claim 7 wherein the housing has a bearing surface annularly surrounding the mouth of the cavity for abutment of the at least one stop surface.

11. The connector as recited in claim 1 wherein the insert is monolithic.

12. The connector as recited in claim 1 wherein at least some of the rod engagement segments have a chamfered tip for facilitating insertion of the insert into the cavity.

13. The connector as recited in claim 1 wherein the insert has a ring shoulder for laterally supporting the insert in the cavity, the ring shoulder being located on the interconnection ends of the segment carrying arms or on the collar.

14. A method of using the connector as recited in claim 1 wherein the insert is rotated within the housing relative to a threaded rod engaged by the rod engagement segments, thereby translating the threaded rod relative to the insert.

15. The connector as recited in claim 1 wherein the cavity has a ring-shaped bottom at an end opposite the mouth.

16. The connector as recited in claim 15 wherein the rod engagement segments are located closer to the bottom than the collar, the collar extending outside the housing.

17. The connector as recited in claim 15 further comprising a screw anchor located partially in the housing.

18. The connector as recited in claim 1 further comprising a screw anchor having a head screwingly connected to the housing.

19. The connector as recited in claim 18 wherein the screw anchor is connected the housing at an end opposite the mouth.

* * * * *